United States Patent [19]

Liu

[11] Patent Number: 5,152,170

[45] Date of Patent: Oct. 6, 1992

[54] UNIVERSAL FUEL MEASURING DEVICE

[76] Inventor: Paul Liu, Rm. 1004, 600, Ming Chuan E. Rd., Taipei, Taiwan

[21] Appl. No.: 780,499

[22] Filed: Oct. 22, 1991

[51] Int. Cl.⁵ ............................................. G01F 23/36
[52] U.S. Cl. ..................................... 73/317; 116/229
[58] Field of Search .......................... 73/317; 116/229; 338/33

[56] References Cited

U.S. PATENT DOCUMENTS

| | | | |
|---|---|---|---|
| 1,141,500 | 6/1915 | Stahle | 73/317 |
| 1,355,939 | 10/1920 | Cole et al. | 73/317 X |
| 1,634,165 | 6/1927 | Williams | 73/317 |
| 4,671,121 | 6/1987 | Schieler | 73/317 |
| 4,928,526 | 5/1990 | Weaver | 73/317 X |

FOREIGN PATENT DOCUMENTS 8776 of 1908 United Kingdom .................. 73/317

*Primary Examiner*—Daniel M. Yasich
*Attorney, Agent, or Firm*—Browdy and Neimark

[57] ABSTRACT

An universal fuel measuring device including an adjusting stem and an adjusting block having a sensor; the adjusting stem is formed with reinforcing grooves on its two sides and a slot at its middle portion; the adjusting block is connected with the adjusting stem and movable along the slot thereof; the sensor has a slide seat connected with a rod member; one end of the rod member is fitted with a float, whereby the adjusting block can slide along the slot of the adjusting stem to provide various specifications to suit any types of fuel tanks, and the reinforcing grooves of the adjusting stem strengthen the same to prevent the same from being distorted by vibration of a car or rushing fuel flow supplied from a fuel gun.

1 Claim, 4 Drawing Sheets

UNIVERSAL FUEL MEASURING DEVICE

BACKGROUND OF THE INVENTION

The present invention relates to an universal fuel measuring device, which can be adjusted to suit various fuel tanks with different specifications. The present fuel measuring device is reinforced by reinforcing structure so as to avoid distortion thereof. The disposing orientation of the fuel measuring device can be adjusted according to the types of the fuel tanks.

In early time, respective parts of a car are manually made individually and each mechanism is composed of multiple parts while these parts are not exchangeable. Therefore, it is quite time-costing and labor-costing to manufacture these parts and it is very difficult to repair the mechanism of a car. As a result, the production amount of car is very small.

When the parts of a car become exchangeable, the mass production of car become possible. The exchangeability is achieved by manufacturing respective parts of different cars by the same specification and standardizing these parts, such as screws, nuts, gaskets, etc. Consequently, these parts can be mass-produced and only some necessary adaptations are required when mounting these parts.

However, there are still many parts of a car are not standardized at present time and thus many advanced countries in the world are developing the project of standardization of parts of a car for lowering the cost and promoting the industrial level.

Nevertheless, the standardization of parts of a car is not well developed respecting some items. For example, a conventional fuel measuring device for a fuel tank of a car as shown in FIG. 4 is still not exchangeable with respect to different specifications of fuel tanks. Such fuel measuring device includes an adjusting rod 30 provided with a fixing base 31 at its upper end and fitted with a fixed variable resistor seat 32 at its lower end. The variable resistor seat 32 is connected with a measuring lever 33 the upper end of which is associated with a sensor 34 whereby the level change of the sensor 34 can change the resistance value of the variable resistor seat 32 to control the indication of the fuel meter. The proportion of the measuring lever 33 to the adjusting rod 30 is specifically suitable for a specific fuel tank with special specification. While a fuel tank with otherwise specification will need a different fuel measuring device which should be manufactured by different molding means. Such procedure is very uneconomical.

Moreover, a conventional fuel measuring device has an adjusting rod 30 which is single strip-shaped with unsatisfying strength. Therefore, when feeding fuel into the fuel tank with a large diameter fuel gun, the rushing fuel flow is apt to impact the adjusting rod 30 and distort the same.

Furthermore, the fixing base 31 of such fuel measuring device is mounted at a fixed direction which is unchangeable. Therefore, a specific fuel measuring device is not suitable for another type of fuel tank and thus various specifications of fuel measuring devices will be required.

It is therefore tried by the applicant to develop a universal fuel measuring device which is suitable to be mounted in different specifications of fuel tanks.

SUMMARY OF THE INVENTION

It is a primary object of this invention to provide an universal fuel measuring device wherein the upper end of an adjusting stem is formed with a bent portion on which a fixing seat connected to the fuel meter is threaded. On two sides of the adjusting stem are formed with reinforcing grooves and at the middle portion thereof is formed with a slot. An adjusting block having a variable resistor fixed thereon is slidably fitted with the adjusting stem along the slot. The variable resistor is mounted on a slide seat which is connected with a rod member the upper end of which is fitted with a float. The adjusting block is formed with thread holes whereby bolts can be extended through the slot of the adjusting stem into the thread holes of the adjusting block on the adjusting stem. Accordingly, the length of the rod member connected with the variable resistor can be adapted in accordance with the level of the adjusting block to constitute a fuel measuring device suitable for a fuel tank with a certain specification. The position of the adjusting block on the adjusting stem and the length of the rod member can be freely adjusted to suit various specifications of fuel tanks.

It is a further object of this invention to provide the above fuel measuring device wherein the bent portion of the adjusting stem is formed with a polygonal hole through which the fixing base is threaded on the bent portion whereby the orientation of the adjusting stem can be changed according to the pattern of the fuel tank to avoid limitation thereof.

The present invention can be best understood through the following description and accompanying drawings wherein:

DETAILED DESCRIPTION OF THE PREFERRED EMBODIMENT

Figure 1:
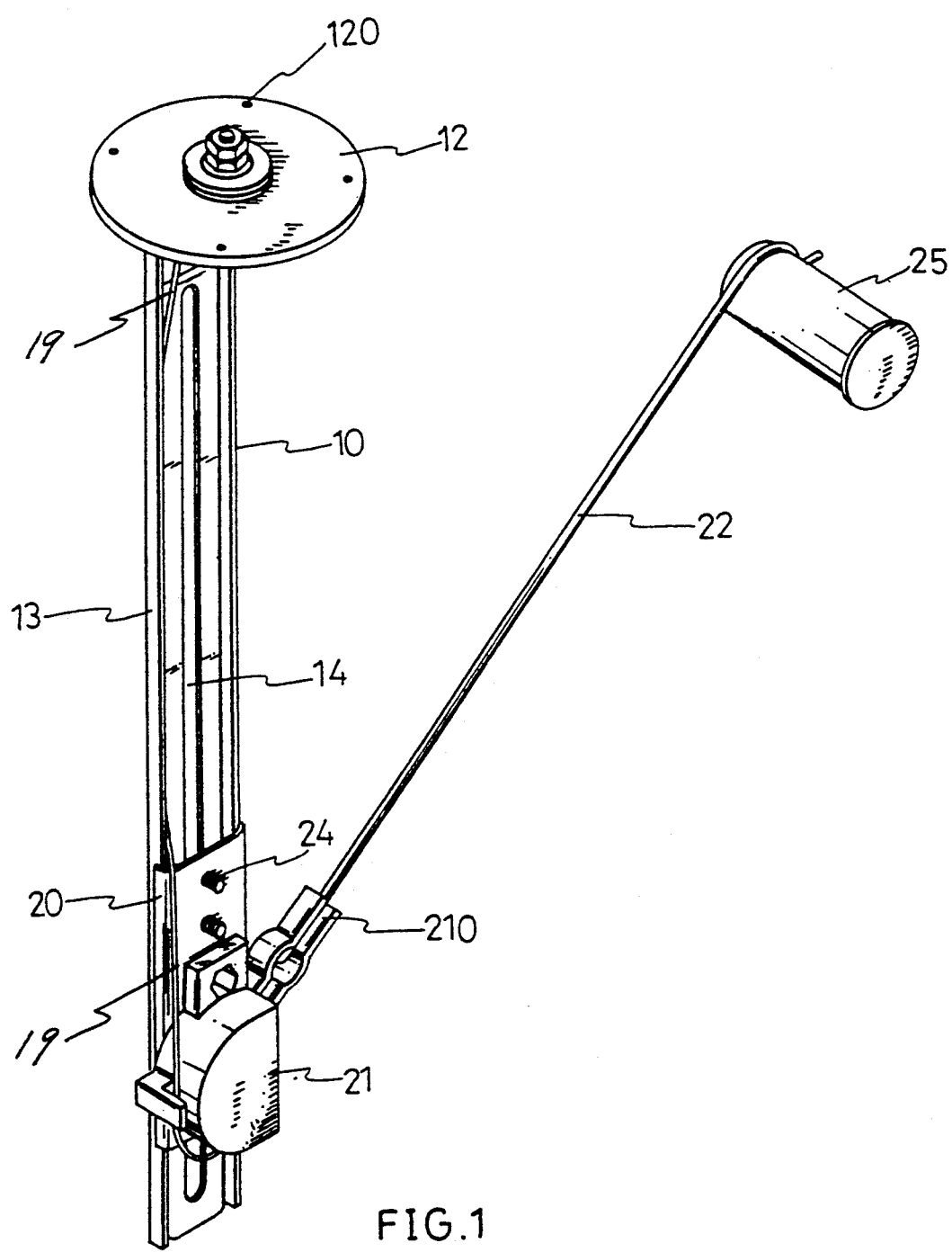
FIG. 1 is a perspective view of the present invention.
Figure 2:
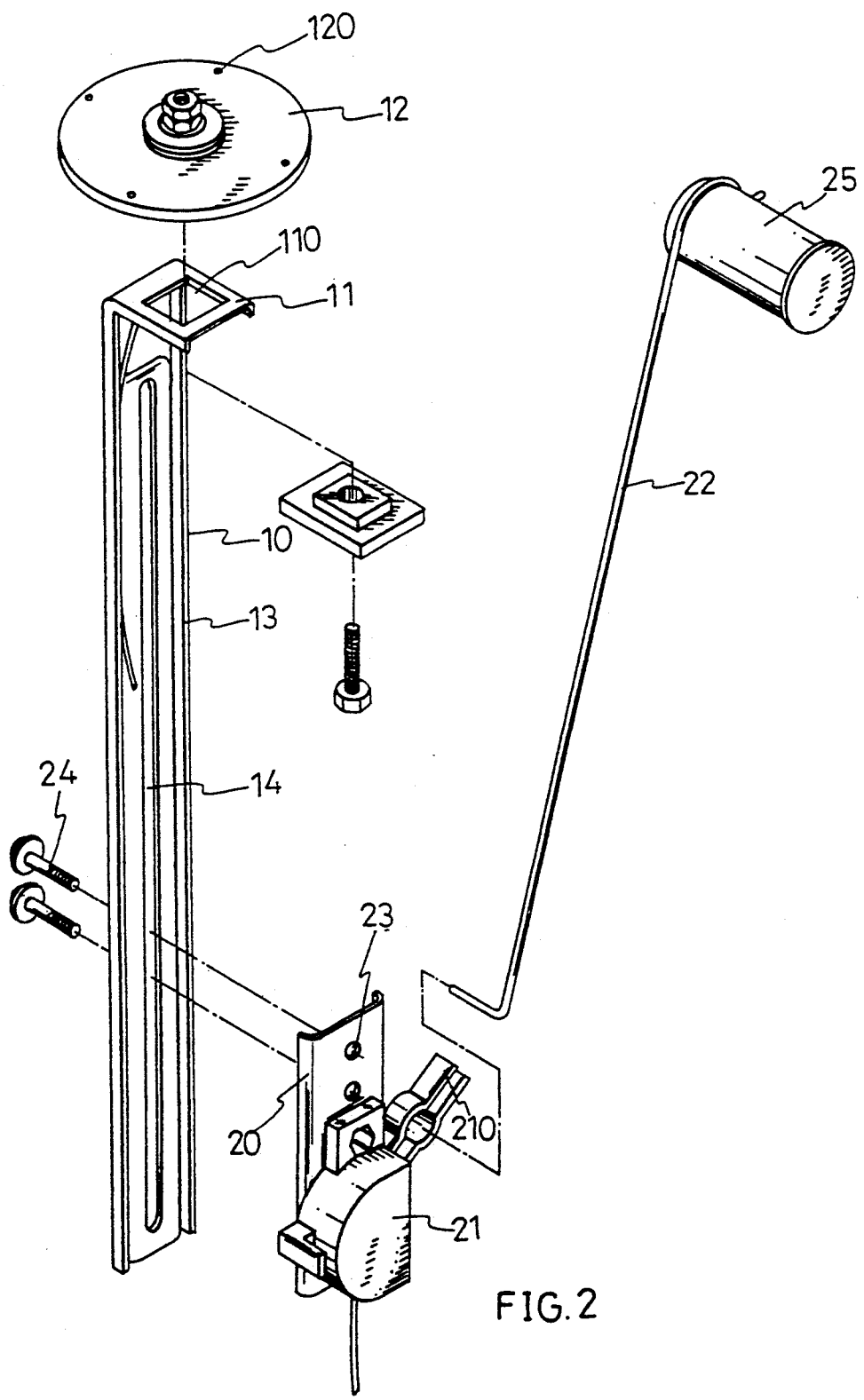
FIG. 2 is an exploded view thereof.

Please refer to FIGS. 1 and 2. The present invention includes an adjusting stem 10 having an upper end formed with a bent portion 11 which is formed with a polygonal hole 110. A fixing base 12 is threaded on the bent portion 11 by a bolt, nut and gasket. The polygonal hole 110 permits the adjusting stem 10 to be changed in direction for suiting various patterns of fuel tanks. The polygonal hole 110 also makes the adjusting stem 10 firmly associated with the fixing base 12 by means of its angled side walls. The angled side walls of the polygonal hole 110 can stop the adjusting stem 10 from loosening and rotating and thus can more closely engage the same with the fixing base 12 than a circular hole. The fixing base 12 is formed with thread holes 120 whereby bolts can be extended through the thread holes to secure the present fuel measuring device to a fuel tank. The fixing base 12 is connected with a fuel meter of a car (not shown) and further connected to the sensor 21 by wires 19, variable resistor being disposed on the adjusting stem 10.

Figure 3:
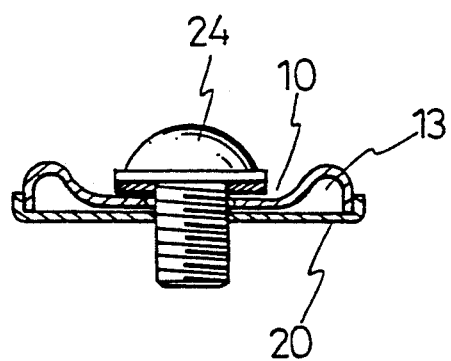
FIG. 3 is a partially sectional view thereof.
Figure 4:
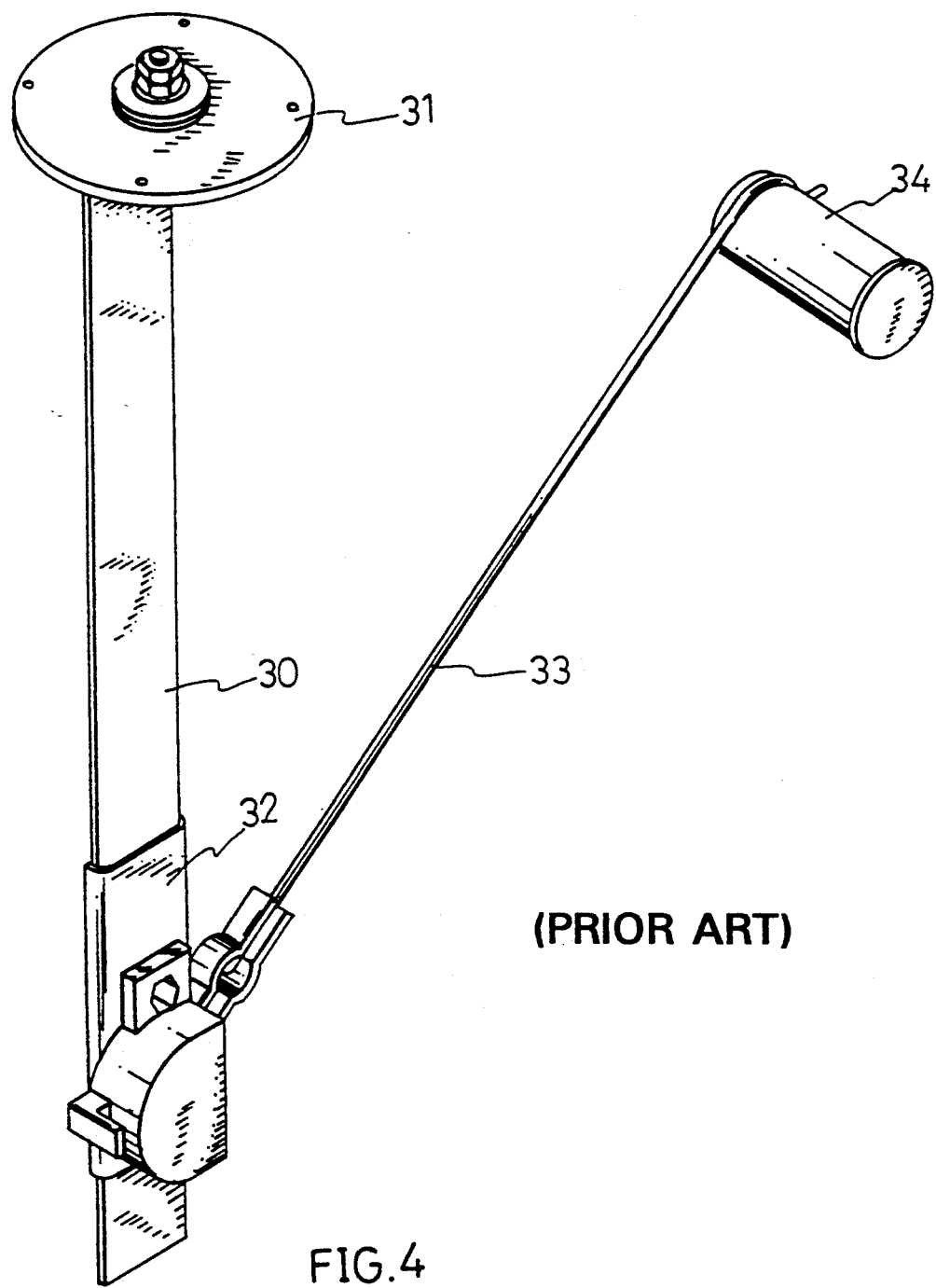
FIG. 4 is a perspective view of a conventional fuel measuring device.

The adjusting stem 10 is formed with reinforcing grooves 13 on its two sides as shown in FIG. 3. The grooves 13 can strengthen the adjusting stem 10 and avoid the distortion thereof due to vibration or fuel flow impact. The middle portion of the adjusting stem 10 is formed with a slot 14 whereby an adjusting block 20 having two bent sides can be fitted to the adjusting stem 10. The adjusting block 20 is formed with thread holes 23 whereby bolts 24 can be extend through the slot 14 of the adjusting stem 10 into the thread holes 23 to slidably secure the adjusting block on the adjusting stem 10. The adjusting block 20 is provided with a variable resistor fixed thereon which has a slide seat 210. A rod member 22 is connected to the slide seat 210. A sensor 25 is fitted to the upper end of the rod member 22 whereby the change of the level of the sensor 25 floating on the surface of the fuel can cause the change of the resistance value of the variable resistor 21 so as to control the indication of the fuel meter through wires 19. The variable resistor 21 and sensor 25 pertain to prior art and will not be described herein.

The position of the adjusting block 20 on the adjusting stem 10 can be adjusted and the length of the rod member 22 fitted with the sensor 25 can be changed in accordance with the position of the adjusting block 20 to constitute a fuel measuring device with a specification suitable for a certain pattern of fuel tank. Different length proportions suit different types of fuel tanks. A table (not shown) on which various proportions of the adjusting stem 10 to the rod members 22 and corresponding specifications of fuel tanks can be disclosed to assist in adapting the claimed fuel measuring device, wherein various depths of different types of fuel tanks are indicated corresponding to lengths of the rod members 22.

The scope of this invention should not be limited by the above description and should be defined by the following claim.

What is claimed is:

1. A universal fuel measuring device having a variable resistor engaged to a first end of a rod member, a second end of said rod member engaged to a sensor, said variable resistor wired to a fuel meter of a car to signal changes in fuel levels, said fuel measuring device comprising:

an adjusting stem having a bent portion at an upper end, said bent portion having a polygonal hole through which said adjusting stem is engaged in selected positions to a fixing base, reinforcing grooves formed along the longitudinal sides of said adjusting stem, a slot formed on the longitudinal centerline of said adjusting stem, an adjusting block releasably engaged to slide in said slot by adjustable bolts, said variable resistor and said sensor associated therewith being fixed on said adjusting block, said fixing base having a plurality of holes corresponding to holes on a fuel tank for mounting of said fixing base to said fuel tank, wherein said adjusting block and said adjusting stem can be adjusted to selected positions so that said sensor associated therewith can be used with different fuel tanks.

* * * * *